US005798930A

United States Patent [19]

van Oosten

[11] Patent Number: 5,798,930

[45] Date of Patent: Aug. 25, 1998

[54] METHOD FOR PROCESSING SHEETS IN MAIL PROCESSING SYSTEM; A MAIL PROCESSING SYSTEM FOR THE PRACTICE OF SUCH METHOD; AND A MAIL PROCESSING APPARATUS OF SUCH SYSTEM

[75] Inventor: Rocus Johannes van Oosten, Groningen, Netherlands

[73] Assignee: Hadewe B.V., Drachten, Netherlands

[21] Appl. No.: 646,694

[22] Filed: May 3, 1996

Related U.S. Application Data

[63] Continuation of Ser. No. 255,939, Jun. 7, 1994, abandoned.

[30] Foreign Application Priority Data

Jun. 7, 1993 [NL] Netherlands ........................... 9300979

[51] Int. Cl.[6] ............................ G06F 17/00; G06F 19/00

[52] U.S. Cl. ................................ 364/478.01; 364/478.08; 364/478.09; 209/584

[58] Field of Search ............................... 364/478, 478.07, 364/478.08, 478.09, 478.11, 478.12, 478.13, 478.14; 209/900, 569, 583, 584; 270/1.1, 4, 5, 6, 54, 58

[56] References Cited

U.S. PATENT DOCUMENTS

| | | | |
|---|---|---|---|
| 4,800,505 | 1/1989 | Axelrod et al. | 364/478 |
| 5,142,482 | 8/1992 | Sansone | 364/478 |
| 5,161,109 | 11/1992 | Keating et al. | 364/478 X |
| 5,283,752 | 2/1994 | Gombault et al. | 364/478 |
| 5,321,624 | 6/1994 | Helffrich et al. | 364/478 |

FOREIGN PATENT DOCUMENTS

| | | |
|---|---|---|
| 0 404 264 | 12/1990 | European Pat. Off. . |
| 0 447 179 2 | 9/1991 | European Pat. Off. . |

*Primary Examiner*—Joseph Ruggiero
*Assistant Examiner*—Sheela S. Rao
*Attorney, Agent, or Firm*—Burns, Doane, Swecker & Mathis, L.L.P.

[57] ABSTRACT

Method for processing sheets in a processing apparatus comprising a plurality of processing stations and a control system controlling at least one processing station for printing sheets and/or assembling sheets to form at least one document to be mailed. By means of a text unit not belonging to the processing apparatus, at least one digital document in digital form is generated, in which at least one digital code also generated with the text unit is included. This code comprises information about the manner in which the control system is to control the processing stations. The digital document is supplied to the control system in digital form, whereafter the control system records the digital document in digital form, recognizes the code and controls the processing station depending on the code.

34 Claims, 1 Drawing Sheet

METHOD FOR PROCESSING SHEETS IN MAIL PROCESSING SYSTEM; A MAIL PROCESSING SYSTEM FOR THE PRACTICE OF SUCH METHOD; AND A MAIL PROCESSING APPARATUS OF SUCH SYSTEM

This application is a continuation, of application Ser. No. 08/255,939, filed Jun. 7, 1994 now abandoned.

BACKGROUND AND SUMMARY

This invention relates to a method for processing sheets in a mail processing apparatus comprising a plurality of processing stations, such as for instance a printer and an inserter, and a control system controlling at least one processing station for printing sheets and/or assembling sheets to form at least one document to be mailed.

The invention also relates to a mail processing system comprising a mail processing apparatus comprising a plurality of processing stations, including, for instance, a printer and an inserter, and a control system controlling at least one processing station for printing sheets and/or assembling sheets to form at least one document to be mailed. In addition, the invention also relates to a mail processing apparatus for use in the above mail processing system.

Such a method, and a mail processing system for practicing that method, are often used when large amounts of documents, such as letters, bills, bank statements and the like are to be mailed. A difficulty involved here is that no efficient method is available for indicating how exactly a document to be mailed is to be assembled. Thus, it is often necessary to indicate whether a letter is merely to be printed, is to be inserted in an envelope, or enclosures are to be added, etc.

Dutch patent application 8901557 presents a proposal for obviating the above-mentioned problems. To that end, the mail processing apparatus is provided with an information source in which information has been entered and stored for producing and assembling an amount of documents. This information source generates a real-time information flow and therewith effects a direct and real-time drive of a plurality of processing stations. For that purpose, the mail processing apparatus further comprises an interface for separating from each other different types of instructions in the information flow.

Such a mail processing apparatus has been found to present practical drawbacks. For instance, the space in which a mail processing apparatus is arranged is typically not the most ideal place for preparing documents to be mailed and for storing these in the information source. Practice shows that the text of a document to be mailed is often prepared at an entirely different location than, for instance, the mailroom where the mail processing apparatus is arranged. The decision in what way the document is to be assembled from sheets is often made at the same location where the document is prepared. Such decisions relate, for instance, to the cutting of sheets, the folding of sheets the sorting of sheets, the addition of enclosures and the filling of envelopes, which in this connection are also designated as a sheet or an assembly of sheets. Not only are the above documents typically prepared at a different location, but a further problem arises in that the above documents are prepared with equipment of an entirely different make than the mail processing apparatus. For instance, the above documents are typically prepared on a mainframe, so that it is impossible, or in any case economically unfeasible, to adapt the software of the mainframe to the mail processing apparatus in such a manner that the mainframe can be used not only to generate the text of the document but also to indicate in what way sheets are to be processed in the mail processing apparatus.

Moreover, such an adaptation of the software typically cannot be implemented uniformly since often different types of mail processing machines are present which cannot be driven uniformly.

The invention meets all of the above disadvantages and to that effect is characterized in that, utilizing a text unit not belonging to the mail processing apparatus, at least one digital document is generated in digital form, in which at least one digital code also generated with the text unit is included, this digital code comprising information about the manner in which the control system is to control the processing stations, the digital document in digital form is supplied to the control system, the control system records the digital document in digital form, recognizes the code and, depending on the code, controls at least one processing station. Because any arbitrary separate text unit can be used to prepare a digital document comprising a digital text and a digital code, the above-mentioned problems are solved. Thus, in accordance with the invention, it is not the text unit that is adapted to the mail processing apparatus but the mail processing apparatus is adapted in order that it can cooperate with all conventional text units. Of course, in accordance with the invention, the mail processing apparatus can also be adapted to non-conventional text units. The major advantage, however, As that the adaptation of the mail processing apparatus can be implemented simply and fast. In this connection, a text unit is for instance a computer or mainframe comprising a word processing program. A digital document is a document in digital form generated with a text unit and may be stored on a diskette, in an electronic memory and all other conventional storage methods. The document thus obtained can be supplied to the control unit in all conventional ways, for instance by means of a diskette, as mentioned, but also by means or a direct connection between the text unit and the control unit.

In accordance with a particular embodiment of the invention, depending on the code, printed sheets are assembled by the processing stations to form the document to be mailed. The code may then comprise, for instance, information about the way in which sheets are folded, enclosures are added, the number of sheets to be inserted in an envelope and how filled envelopes are to be sorted. It is even possible that a part of the sheets or all sheets are preprinted, so that the digital document comprises exclusively digital codes. On the other hand, it is, of course, also possible for the sheets to be printed with the printer of the mail processing apparatus. In particular, depending on the code, at least a part of a sheet is printed by the printer. Thus, it is possible for the code to comprise a shortened designation of a namer address and city, which is printed in its entirety by the printer.

In accordance with one aspect of the intention, the digital document is provided, by means of the text unit, with a code comprising a non-print code, which cannot be printed by the printer. The advantage of this is that the digital code can be placed in a digital text without it being possible to subsequently read this code in the printed document. Here, too, in accordance with the invention, a major advantage is gained in that such codes are often already available on standard word processing software. Thus, the non-print code may for instance comprise an escape sequence. It is also possible, however, to include, for instance, a code beginning and ending with, respectively, a shift-in and a shift-out code from the well known ASCII table. In that case the control unit is adapted to recognize such codes and drive the processing stations accordingly.

It is also possible, however, that the digital document is provided by the text unit with a code comprising a print code which can be printed by the printer. In that case, in accordance with a particular embodiment of the invention, the print code is removed from the digital document by the control system, whereafter the remainder of the digital document is supplied to the printer. The removed print code is interpreted by the control system for driving the processing stations. On the other hand, it is possible, in accordance with the invention, that the print code is not removed from the digital document by the control system, so that the entire digital document, including the print code, is printed by the printer. Of course, in that case the print code can also be used for controlling processing stations as described hereinabove. If the print code is not removed, the print code can for instance be provided, by means of the text unit, with an indication which is characteristic of an addressee or group of addressees. When such an indication is printed on a sheet of paper to be mailed, this will in most cases not be experienced as objectionable or may even be regarded as desirable. The print code can be recognized directly by the control system in the same manner as that in which a non-print code can be recognized, i.e., recognition takes place on the basis of the digital document which is (still) stored in the control system. It is also possible, however, for the control system to comprise an optical reader which scans sheets printed by the printer, detects a print code printed on a sheet and transmits it to the rest of the control system, whereafter the control system drives the above-mentioned processing stations for printing sheets and/or assembling sheets to form the document to be mailed, depending on at least the print code. Accordingly, in the latter case, the print code is not recognized until it has been printed by a printer of the mail processing apparatus.

The addition of a code to a digital document need not be carried out with the word processing program of the text unit with which the text of the digital document is generated. It is also possible to temporarily start another program, from or side by side with the word processing program, which is particularly suitable for adding a code to the digital document. After the code has been inputted, the latter program can be ended, whereafter, if so desired, it is possible to continue with the word processing program. This last-mentioned program can address a memory of a text unit through the keyboard data flow as well as directly. It is moreover possible to input the code by way of a separate input unit which is coupled to the text unit.

For the recognition of codes, i.e., print codes and non-print codes, many possibilities are conceivable in accordance with the invention. The examples given hereinafter should therefore not be considered limitative. Thus, it is for instance possible for a code or a part thereof to be recognized by the control system on the basis of its position in the document. This may for instance be the first or the last line of the document. According to another method it is possible for a code or a part thereof to be recognized by the control system on the basis of its content. This may for instance be a bank account number or giro account number which represents a code indicating, for instance, to which address a printed sheet is to be mailed. Another possibility involves a number of lines at the end of a document, where the enclosures of the document are enumerated. By counting this number, a print code is defined, which indicates how many enclosures belong to the document.

In accordance with an entirely different aspect of the invention, the control system comprises a data base which is designed to be addressable with a code, the arrangement being such that the control system addresses the data base on the basis of a code obtained from a digital document, reads out the information stored in the data base at the address corresponding with the code, and, on the basis of this information, drives the processing stations for printing sheets and/or assembling these sheets to form the document to be mailed. In accordance with this set-up of the invention, it is for instance possible to limit the length of a code in a digital document while nonetheless with this short code large amounts of control information can be transmitted to the various processing stations. Thus, the information from the data base may comprise a predetermined text part which is printed on the sheets by the printer. It is also possible, however, that the data base comprises series of control commands for other processing stations, which can be called by means of the code.

The code-concept according to the invention opens up a whole range of possibilities where this code can be applied. The code may for instance be unique, such as a name-address-and-city, but may also designate a group of addressees, such as for instance a zip code would. On the basis of such a code it can for instance be determined which enclosures should be added to a letter. Such a code can also be used to control a franking machine belonging to the mail processing apparatus. The date of a document can also function as a code or part thereof, so that, depending on the date of the document to be mailed it can be determined which enclosure is added. On the basis of a print code as well as a non-print code, the order of documents to be processed can be determined. If, for instance, advertising material is to be mailed to a large group of addressees personally, the documents, before being printed, can be sorted according to zip code on the basis of the code.

If a print code is used which cannot be recognized by the control system before it has been printed, sorting, of course, can only take place after printing.

It is also possible that, on the basis of a code recognized by the control system, a new code is generated which is subsequently printed. The new code can for instance comprise a bar code which is generated on the basis of a 'sofi' number [official Dutch social-fiscal registration number] which functions as the code to be recognized by the control system.

Another particular application of the code-concept according to the invention is the verification of the correctness of data on the basis of a code recognized by the control system. Thus, a bank account number can for instance function as a code with which the data base referred to is addressed. Stored in this data base are all addresses which belong to such an account number, so that the control system can check whether the address addressed by the code corresponds with the address mentioned in the digital document.

According to a very particular embodiment of the invention, by means of the control system a data base is built up on the basis of codes recognized by the control system. If the code concerns, for instance, an addressee or group of addressees, it can be monitored what documents have been mailed to whom at any given time. This makes it possible on the basis of the data base to afterwards generate statistical information about documents which have been mailed. At the same time it can be monitored how intensively certain processing stations have been used. On the basis of this information it can be determined whether certain components—processing stations—of the mail processing apparatus need to be serviced, should be replaced or, for instance, have to be resupplied with sheets. In addition, on the basis of the data base built up, status reports can be generated which state at what time a document was mailed to an addressee.

The supply of a digital document generated with the separate text unit to the control system of the mail processing apparatus can be implemented in different ways. According to an advantageous method, the digital document generated by the text unit is stored on a data carrier, such as for instance a diskette, whereafter the data carrier is brought to the control system and subsequently read out by the control system. It is also possible, however, that the digital document generated by the text unit is supplied to the control system by way of a line.

According to a highly progressive aspect of the invention, the control system generates feedback information comprising data about sheets and/or documents processed by the mail processing apparatus. This feedback information can be stored on a diskette, for instance to be evaluated at a different location at a later time. It is also possible for this information to be supplied to a separate mainframe, where a file can be set up which comprises data about the sheets processed by the mail processing apparatus. The uses of this file are comparable to those indicated above with reference to the data base built up by the control system itself.

A mail processing system according to the invention is characterized in that the system further comprises a separate text unit, not belonging to the mail processing apparatus, with which at least one digital document can be generated in digital form, in which at least one digital code also generated with the text unit is included, this digital code comprising information about the manner in which the control system is to control the processing stations for printing and assembling sheets, and the control system, when the digital document is being supplied to it in digital form, records the digital document in digital form, recognizes the code and, depending on the code, controls at least one processing station.

BRIEF DESCRIPTION OF THE DRAWING FIGURE

The invention will now be further elucidated with reference to FIG. 1 showing a mail processing system according to the invention.

DETAILED DESCRIPTION

Figure 1:
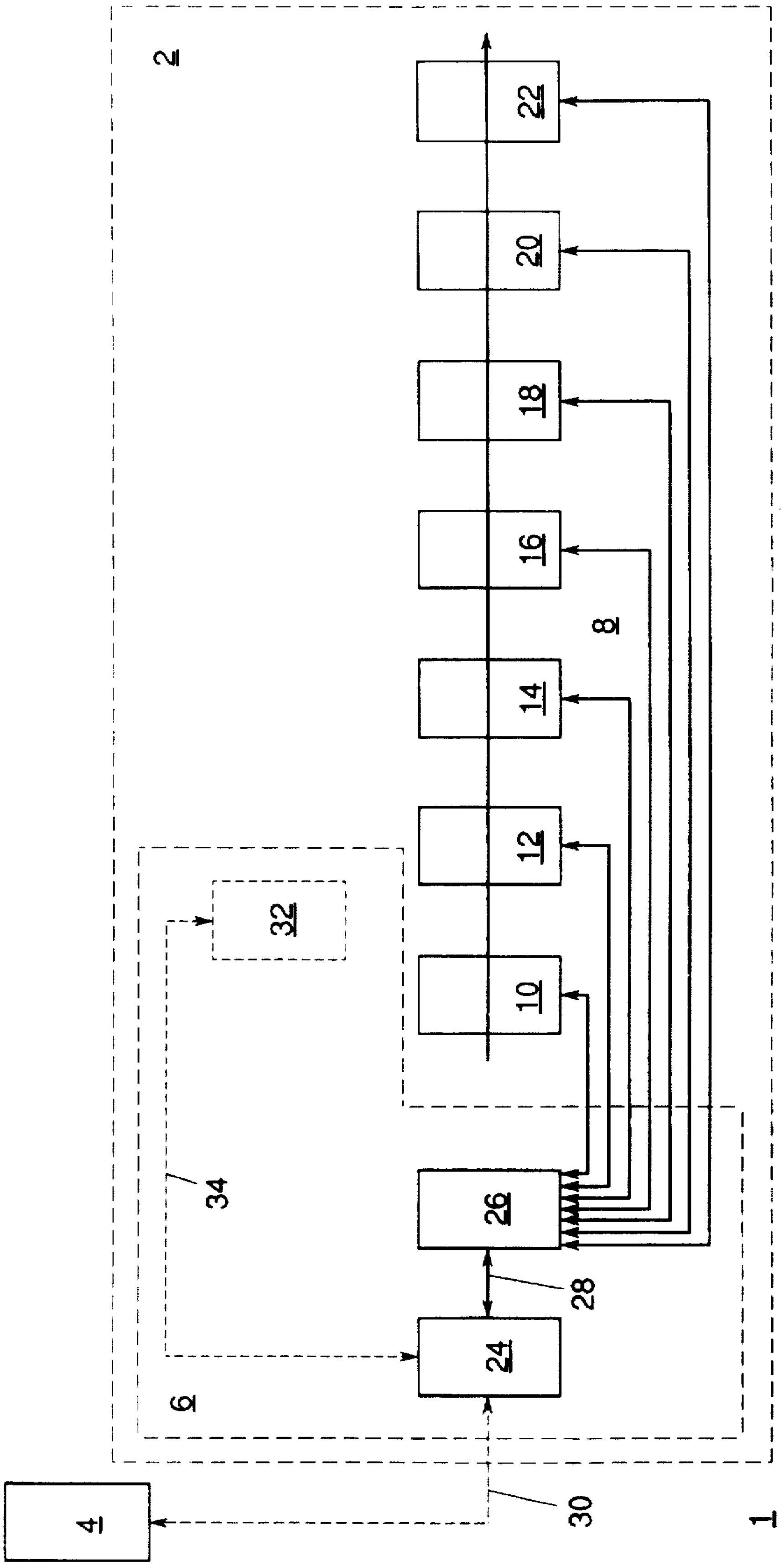

Reference numeral 1 in FIG. 1 denotes a mail processing system. The mail processing system 1 comprises a mail processing apparatus 2 and a text unit 4. The text unit 4 is, for instance, a separate mainframe computer which does not form any part of the mail processing apparatus 2. Such a mainframe computer may be provided with a word processing program of the type which is generally known and thus can function as a text unit with which digital documents can be prepared. A digital document is a document generated with the text unit 4 and which can be stored in digital form on a diskette, in an electronic memory of, for instance, the text unit 4 or all other conventional means for storage.

The standard text unit 4 is often already available when the mail processing apparatus is purchased and will typically be disposed at an entirely different location in a building than is the mail processing apparatus 2. It is essential, accordingly, that the text unit 4 and the mail processing apparatus 2 may be of entirely discreet design and be stationed entirely separately from each other.

The mail processing apparatus 2 comprises a control system 6 and a mail processing line 8. The mail processing line comprises, for instance, the following processing stations: a printer 10, a burster 12, an accumulating station 14, an enclosure adder 16, a folding machine 18, an inserter machine 20 and a franking machine 22. It is pointed out with emphasis that the type, order and number of the above processing stations are given exclusively by way of example and can be varied in many ways. The arrow 24 indicates the direction in which the processing of sheets to form mail pieces proceeds. The sheets may in this connection also comprise envelopes which are filled with other sheets. Moreover, for the sake of completeness, it is further observed that the burster 12 suggests the use of fanfold forms. It is, of course, also possible to process loose sheets so that the burster 12 can be omitted.

The arrows between the control system 6 on the one hand and the processing stations 10–22 on the other in each case represent a channel for transmitting information from the control system 6 to the processing stations 10–22 and vice versa. The control system 6 in this case comprises a computer 24 and an interface 26, which are connected with each other through a line 28.

The mail processing system 1 according to the invention works as follows. By means of the text unit 4 a digital document is generated which comprises a text for a document to be mailed. A digital document is a document in digital form generated by the text unit 4 and may be stored on a diskette, in an electronic memory and all other conventional means for storage. By means of the text unit 4 the digital document is further provided with a digital code comprising information about the manner in which the control system 6 is to control the processing stations 10–22 or a plurality of these processing stations. The digital code may comprise a non-print code and/or a print code. A non-print code is a set of digital characters which are not recognized by the printer 10 and therefore cannot be printed. If the text unit 4 utilizes, for instance, the ASCII table for binary registration of data, different combinations of codes from this table can be used as a non-print code. An example of this is the escape sequence, which, however, does not exclude other conceivable possibilities. Of course, other tables, such as the five-bit telex table or the eight-bit EBCDIC table, can be used as well for generating and registering the digital document.

However, a code may also comprise a print code. In this connection a print code is understood to mean a code which can be recognized by the printer 10 and results in the printing of a characters number, punctuation mark, any other symbol or a combination thereof when the print code is supplied to the printer. In this connection a space can also be seen as a possible print code or part of a print code. Practically speaking, a print code often involves a set of characters in the digital document which are visible as normal text on a screen of the text unit 4.

When the digital document has been prepared, it is supplied to the control system 6 of the mail processing apparatus 2. In the drawing the supply line 30 is depicted diagrammatically by broken lines and represents any possible way of supplying the digital document to the control system 6. Thus, it is possible for the digital document to be stored on a diskette by the text unit 4. The diskette is subsequently read by a disk-drive (not shown) of the computer 24. It is also possible, however, for the broken line 30 to represent an electrical line whereby the digital document can be transferred from the text unit 4 to the computer 24.

The document thus supplied to the computer 24 is further processed for driving the work stations 10–22 of the mail processing line 8. In accordance with a first embodiment, the control system 6 recognizes the codes from the digital document. These codes may for instance be recognized by their specific content (length of the code, structure of the code, et cetera) or by a specific predetermined position in the digital document where codes may be stored. It is, of course, also possible to use a combination of the above examples. In the present example, the digital document is transmitted from the computer 24 to the interface 26 and the recognition of the code is performed by the computer 24. The computer 24 passes the code to the interface 26. The interface 26 converts the detected code into control signals which are transmitted to the relevant processing stations. The document is also fed, by way of the interface 26, to the printer 10. If the code consists of a non-print code, the entire document can be fed directly to the printer 10 by way of the interface 26. In that case the non-print code will not be printed. If the code comprises a print code, the print code, if so desired, can be removed by the computer 24 from the digital document, which is subsequently fed to the printer 10 by way of the interface 26. In addition, it is possible to replace the print code by a blank space or line, or by standard text, such as a running headline. Of course, it is also possible for the print code not to be removed and to be printed by the printer.

In accordance with a particular embodiment, the control system 6 further comprises an optical reader 32 which is connected with the computer 24 via a line 34. This reader can be used when the digital document comprises a print code which is printed by the printer 10. The print code can for instance be printed on the tearing edge of a fanfold form, but also in a random or fixed position in the rest of the printed document. By means of the optical reader 32, the computer 24 scans the document printed by the printer 10 and recognizes the print code, for instance by one or more of the above-mentioned methods. The print code recognized by the computer is fed to the interface which subsequently converts this print code into control signals with which the processing stations or a plurality of the processing stations are driven. It is pointed out with emphasis that the print code printed on a sheet may comprise not only control instructions for the processing stations for further processing the sheet in question but also for processing entirely different sheets which have not been printed yet or which have already been printed but are still traversing the mail processing line 8.

As stated above, the instructions converted into control signals for controlling the processing stations are transmitted to the processing stations 10–22. The control signals should result in the desired treatment at the instant when the document or a set of documents belonging to each other reach the processing station to which these instructions relate. If a number of documents or sets of documents which are to be kept separate, are simultaneously present in the processing line 8, the instant at which the treatment in question should be performed can be determined extremely reliably by means of the interface 26 and the 'ready' feedback signals transmitted to the interface from the stations, or on the basis of synchronization signals which the interface 26 generates itself. In the latter case, the feedback of signals from the processing stations 10–22 to the interface 26 can optionally be omitted. It is recommended, however, to provide at least for the signaling of failure of the interface 26 to enable automatic discontinuation of the generation of documents and/or sets of documents in the mail processing line 8 in case of failure.

To obtain a set of documents, it is possible to include an accumulating station 14 directly downstream of the printer 10 or, in the case of fanfold paper, downstream of the burster 12. Assembling the documents to form a set can then be realized, in accordance with the invention, by direct conversion of the relevant codes into control signals. If the set consists, for instance, of a letter to be signed, then it can be removed from the mail processing line 8 by a corresponding control in, for instance, the accumulating station 14 or any other subsequent processing station. If the set is to be subsequently inserted again into the mail processing line or another similar mail processing line, then it may be preferable to provide further processing instructions in the form of print codes on the documents by means of the printer. Accordingly, in that case, a part of the codes is converted directly into control signals and another part into print codes. In such a case, use can be made of an apparatus comprising the optical reader 32.

It will be understood that within the scope of the invention many modifications and variants are possible. It has already been mentioned that the mail processing line 8 can be made up of any desired number of components of any desired type and in any desired order. Further, the arrows representing the various information flows between the various components of the apparatus are each provided with an arrowhead at either end to indicate that feedback signals can be generated to obtain optimum control of the apparatus. These feedback signals can contain all kinds of information, such as the completion of a particular operation, the passage of a document or set of documents, the report of failure, etc.

In accordance with a particular embodiment of the mail processing apparatus, the computer 24 comprises a data base designed to be addressable with a code. This data base can for instance be stored on a hard disk of the computer. The computer 24 addresses the data base on the basis of a code obtained from a digital document. The information stored in the data base at the address corresponding with the code is subsequently read out and fed to the interface 26. The interface 26 converts this information into control signals with which the processing stations are driven for the purpose of printing sheets and/or assembling these sheets to form the document to be mailed. According to this set-up of the invention, it is for instance possible to limit the length of a code while nonetheless with this short code large amounts of control information can be transmitted to the various processing stations.

It is also possible that on the basis of a code recognized by the computer 24 a new code is generated which is subsequently printed. The new code may for instance comprise a bar code which is generated on the basis of a social-fiscal registration number which functions as the code to be recognized by the control system.

Another particular application of the code-concept according to the invention is the verification of the correctness of data on the basis of a code recognized by the control system. Thus, with a code recognized by the computer, the data base can be addressed. Then the information stored at the relevant address can be compared by the computer with another part of the digital document which should correspond with this information.

According to a very particular embodiment of the mail processing apparatus 2, a data base is built up by the computer 24 on the basis of codes recognized by the computer 24. In this way for instance statistical information about documents which have been mailed is generated. It is also monitored how intensively specific processing stations 10–22 have been used. On the basis of this information it is determined whether certain parts—processing stations—of the mail processing apparatus need to be serviced, replaced or, for instance, resupplied with sheets. In addition, on the basis of the data base built up, status reports are generated stating at what time a document was mailed to an addressee. These status reports are printed by the printer 24.

In accordance with a highly advanced embodiment of the mail processing apparatus 2, the computer 24 generates feedback information comprising data about sheets and/or documents processed by the mail processing apparatus. This feedback information can be stored on a diskette, for instance to be evaluated at a different location at a later time. It is also possible for this information to be fed by way of a line 30 to the text unit 4 where a file can be set up which comprises data about sheets processed by the mail processing apparatus. The uses of this file are comparable to those indicated hereinabove with reference to the file built up by the control system itself.

Finally, it is noted that the recognition of a code can also be performed by the interface 26. Further, the interface 26 and computer 24 may be integrated to form one unit of the control system 6.

I claim:

1. A method for processing sheets in a mail processing apparatus comprising a plurality of processing stations, including at least a printer and an inserter, and a control system controlling at least one processing station for printing at least one sheet and processing said at least one sheet to form at least one document to be mailed, the method comprising the steps of:

generating at least one document in the form of electronic digital signals utilizing a text unit not belonging to the mail processing apparatus, the at least one electronic digital document including electronic digital text and at least one electronic digital code also generated by the text unit, wherein said electronic digital code comprises information about the manner in which the control system is to control the processing stations;

supplying the electronic digital document to the control system in electronic digital signal form;

printing the text of the electronic digital document on the at least one sheet with the printer under the control of the control system;

recognizing the electronic digital code in electronic digital signal form directly from the electronic digital document with the control system; and responsive to the electronic digital code recognized by the control system directly from the supplied electronic digital document, controlling at least one processing station other than the printer for processing the at least one printed sheet to obtain the at least one document to be mailed.

2. A method according to claim 1, wherein, responsive to the code, at least a part of a sheet is printed by the printer.

3. A method according to claim 1, wherein the digital electronic code comprises a non-print code which cannot be printed by the printer.

4. A method according to claim 3, wherein the non-print code comprises an escape sequence or a code sequence including shift-in/shift-out codes.

5. A method according to claim 1, wherein the digital electronic code comprises a print code which can be printed by the printer.

6. A method according to claim 5, wherein the print code is removed from the digital document by the control system, whereafter the remainder of the digital document is supplied to the printer.

7. A method according to claim 5, wherein the print code is not removed from the digital document by the control system, so that the entire digital document including the print code is printed by the printer.

8. A method according to claim 7, wherein the print code is provided with an indication characteristic of an addressee or group of addressees.

9. A method according to claim 1 wherein a code or part of a code is recognized by the control system on the basis of its position in the document.

10. A method according to claim 1 wherein a code or part of a code is recognized by the control system on the basis of its content.

11. A method according to claim 1, wherein the control system comprises a data base addressable with a code, and wherein the control system addresses the data base based on a code obtained from the digital document received from the text unit, reads the information which is stored in the data base at the address that corresponds with the code, and, responsive to this information, controls the processing stations for printing sheets and assembling printed sheets to form the document to be mailed.

12. A method according to claim 11, wherein the information from the data base comprises a predetermined text part which is printed on the sheets by the printer.

13. A method according to claim 1, further comprising the step of compiling a data base of codes recognized by the control system.

14. A method according to claim 1 wherein the digital document produced by the text unit is stored on a data carrier, whereafter the data carrier is read by the control system.

15. A method according to claim 1, wherein the digital document produced by the text unit is supplied to the control system with the aid of a line.

16. A method according to claim 1, wherein the control system generates feedback information comprising data about sheets and documents processed by the mail processing apparatus.

17. A method according to claim 1, wherein the control system comprises a data base addressable with a code, obtained from a digital document received from the text unit, the control system including means for reading information stored in the data base at an address that corresponds with the code, and, responsive to this information, control the processing stations for printing sheets and assembling printed sheets to form the document to be mailed.

18. A mail processing system according to claim 17, wherein the information from the data base comprises a predetermined text part which is printed on the sheets by the printer.

19. A mail processing system comprising:

a mail processing apparatus comprising a plurality of processing stations, including at least a printer and an inserter, and a control system controlling the printer and at least one other processing station for printing at least one sheet and processing said at least one sheet to form at least one document to be mailed;

a separate text unit, not belonging to the mail processing apparatus, for generating at least one digital document in electronic digital signal form, including electronic digital text and at least one electronic digital code also generated with the text unit, said electronic digital code comprising information about the manner in which the control system is to control the processing stations for printing and processing the at least one sheet; and means for communicating the electronic digital document from the text unit to the control system in electronic digital signal form, wherein the control system includes means for controlling the printer to print the text of the electronic digital document on the at least one sheet, recognizing the electronic digital code directly from the supplied electronic digital document in electronic digital signal form, and responsive to the electronic digital code which has been recognized directly from the electronic digital document, controlling at least one processing station other than the printer for processing the at least one sheet to obtain the at least one document to be mailed.

20. A mail processing system according to claim 19, wherein the means for reading and responding to the code allows the control system to print at least a part of a sheet by the printer.

21. A mail processing system according to claim 19, wherein the text unit generates in the digital document a code comprising a non-print code not printable by the printer.

22. A mail processing system according to claim 21, characterized in that wherein the non-print code comprises at least one of an escape sequence and a shift-in/shift-out.

23. A mail processing system according to claim 19, wherein the text unit generates in the digital document a code comprising a print code printable by the printer.

24. A mail processing system according to claim 23, wherein the control system includes means for removing the print code from the digital document before the digital document is supplied to the printer.

25. A mail processing system according to claim 23, wherein the control system transmits the entire digital document including the print code for printing by the printer.

26. A mail processing system according to claim 25, with the aid of the text unit the print code includes an indication characteristic of an addressee or group of addressees.

27. A mail processing system according to claim 19, wherein the control system includes means to recognize a code or part of a code on the basis of a position of the code in a document.

28. A mail processing system according to claim 19, wherein the control system includes means to recognize a code or part of a code on the basis of a content of the code.

29. A mail processing system according to claim 19, wherein the control system includes means to compile a data base on the basis of codes recognized by the control system.

30. A mail processing system according to claim 19, wherein the text unit comprises means for storing the digital document produced with the text unit on a data carrier, and the control system comprises means for reading the information of the data carrier.

31. A mail processing system according to claim 19, wherein the system further comprises a line with which the digital document produced by the text unit is supplied to the control system.

32. A mail processing system according to claim 19, wherein the control system includes means for generating feedback information comprising data about at least one of sheets and documents processed by the mail processing apparatus.

33. A method for processing sheets in a mail processing apparatus comprising a plurality of processing stations, including a printer and at least one other processing station, and a control system controlling at least one processing station for printing sheets and assembling sheets to form at least one document to be mailed, the method comprising the steps of:

generating at least one document in electronic digital form utilizing a text generating unit not belonging to the mail processing apparatus, the at least one electronic digital document including electronic digital text and at least one electronic digital print code also generated by the text unit, said electronic digital print code comprising a set of characters visible as normal text on a screen of the text unit, wherein said digital print code comprises information for use by the control system to control the processing stations;

supplying the digital document to the control system in electronic digital signal form;

recording the digital document in electronic digital signal form with the control system;

recognizing the electronic digital print code directly from the electronic digital document;

printing the text and the print code of the electronic digital document on at least one sheet with the printer under the control of the control system, and responsive to the electronic digital print code, controlling the at least one other processing station for assembling the at least one printed sheet into the document to be mailed.

34. A mail processing system comprising:

a mail processing apparatus comprising a plurality of processing stations, including a printer and at least one other processing station, and a control system controlling the printer and the at least one other processing station for printing sheets and assembling sheets to form at least one document to be mailed;

a separate text unit, not belonging to the mail processing apparatus, for generating at least one digital document in digital electronic signal form, including a digital text and at least one digital print code also generated by the text unit, said digital print code comprising a set of characters which are visible as normal text on a screen of the text unit, wherein said digital print code comprises information for use by the control system to control the processing stations for printing and assembling sheets; and means for communicating the digital document from the text unit to the control system in digital electronic signal form, wherein the control system includes means for recording the digital document in digital electronic signal form, recognizing the digital print code in digital electronic signal form directly from the digital document, controlling the printer to print the digital text and the digital print code on at least one sheet and, responsive to the digital print code in digital electronic signal form, controlling the at least one other processing station for assembling the sheets as the at least one document to be mailed.

* * * * *